United States Patent [19]
Itoh et al.

[11] Patent Number: 5,609,839
[45] Date of Patent: Mar. 11, 1997

[54] NO$_x$ REMOVAL CATALYST AND METHOD OF PURIFYING EXHAUST GAS BY USING THE SAME

[75] Inventors: Takashi Itoh; Yukio Kosaki; Takeshi Chonan; Takashi Matsuda; Yasuharu Kanno, all of Ichikawa; Masao Wakabayashi, Chiba; Makoto Nakamura, Ichikawa, all of Japan

[73] Assignees: N.E. Chemcat Corporation; Sumitomo Metal Mining Co., Ltd., both of Tokyo, Japan

[21] Appl. No.: 463,889

[22] Filed: Jun. 5, 1995

Related U.S. Application Data

[62] Division of Ser. No. 358,373, Dec. 19, 1994.

[30] Foreign Application Priority Data

| Dec. 17, 1993 | [JP] | Japan | 5-344302 |
| Mar. 17, 1994 | [JP] | Japan | 6-046632 |
| May 25, 1994 | [JP] | Japan | 6-135135 |

[51] Int. Cl.$^6$ .................................. B01J 8/02
[52] U.S. Cl. .......................... 423/213.2; 423/239.1; 423/212
[58] Field of Search ................ 423/213.2, 239.1, 423/212

[56] References Cited

U.S. PATENT DOCUMENTS

| 4,025,606 | 5/1977 | Acres | 423/245.3 |
| 4,124,536 | 11/1978 | Itoh et al. | 502/244 |
| 4,650,782 | 3/1987 | Onal | 502/339 |

FOREIGN PATENT DOCUMENTS

| 0526099A1 | 2/1993 | European Pat. Off. . |
| 0605237A1 | 7/1994 | European Pat. Off. . |
| 4281844 | 10/1992 | Japan . |
| WO9304774 | 3/1993 | WIPO . |

OTHER PUBLICATIONS

Translation of '844 attached to reference.
T. Miyadera, *Applied Catalysis B: Environmental*, 2(2), 199–205 (1993) (Jun.).
W. Gerhartz et al., *Ullmann's Encyclopedia of Industrial Chemistry*, vol. A1, Edition 5, pp. 588–592 (1985) (no month).

*Primary Examiner*—Gary P. Straub
*Assistant Examiner*—Thomas G. Dunn, Jr.
*Attorney, Agent, or Firm*—Wenderoth, Lind & Ponack

[57] ABSTRACT

A NO$_x$ removal catalyst resistant to high temperatures, comprising an activated alumina wherein the specific surface area measured by the nitrogen adsorption method is 120 m$^2$/g or more, the bulk density measured by the mercury porosimetry is 0.60 g/cm$^3$ or more, and the skeleton density measured by the mercury porosimetry is 1.80 g/cm$^3$ or less and silver carried on said activated alumina. Then said catalyst or a structure having said catalyst coated on a substrate is brought in contact with exhaust gas from an internal combustion engine that is operated at a lean fuel/air ratio, such as a lean-burn engine, NO$_x$ can be removed efficiently within a quite short contact time.

10 Claims, 5 Drawing Sheets

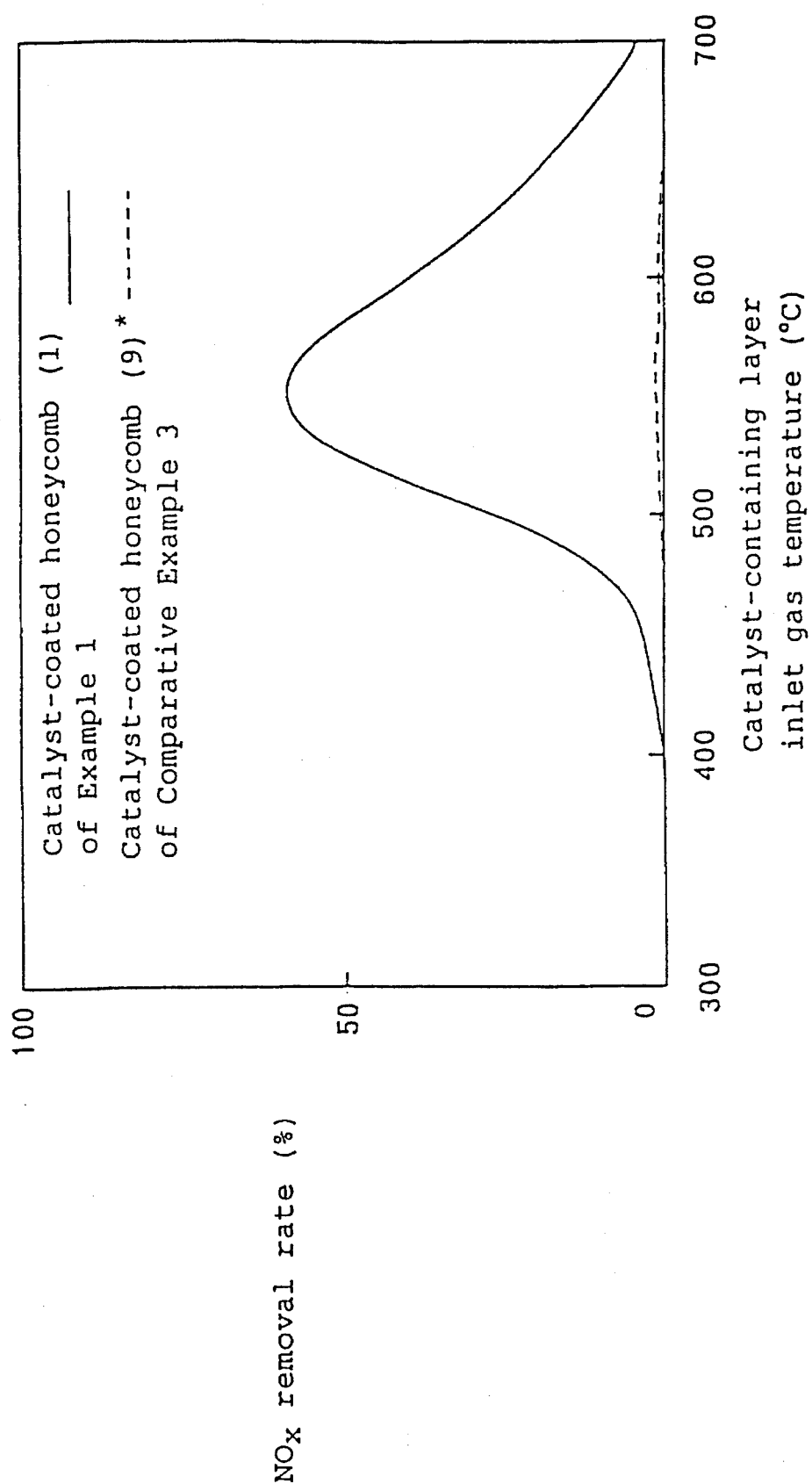

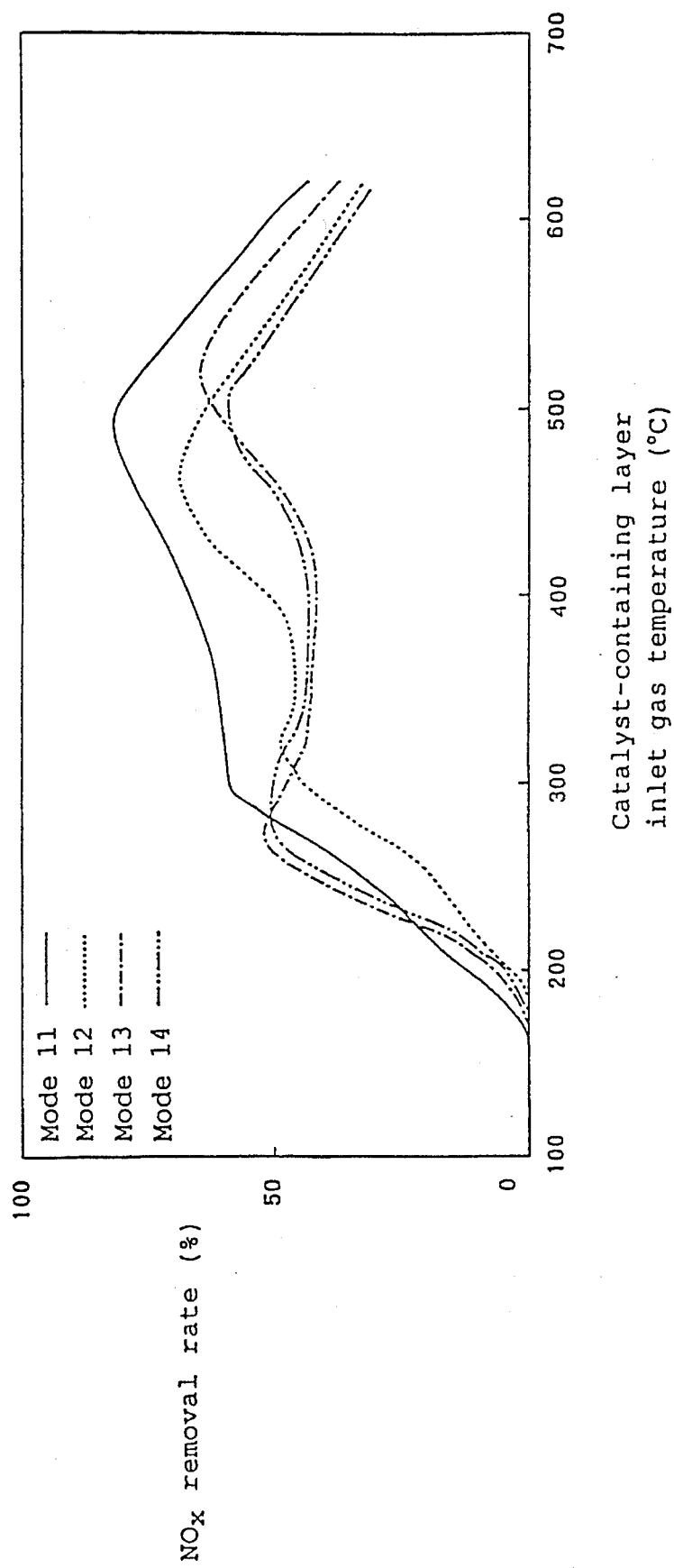

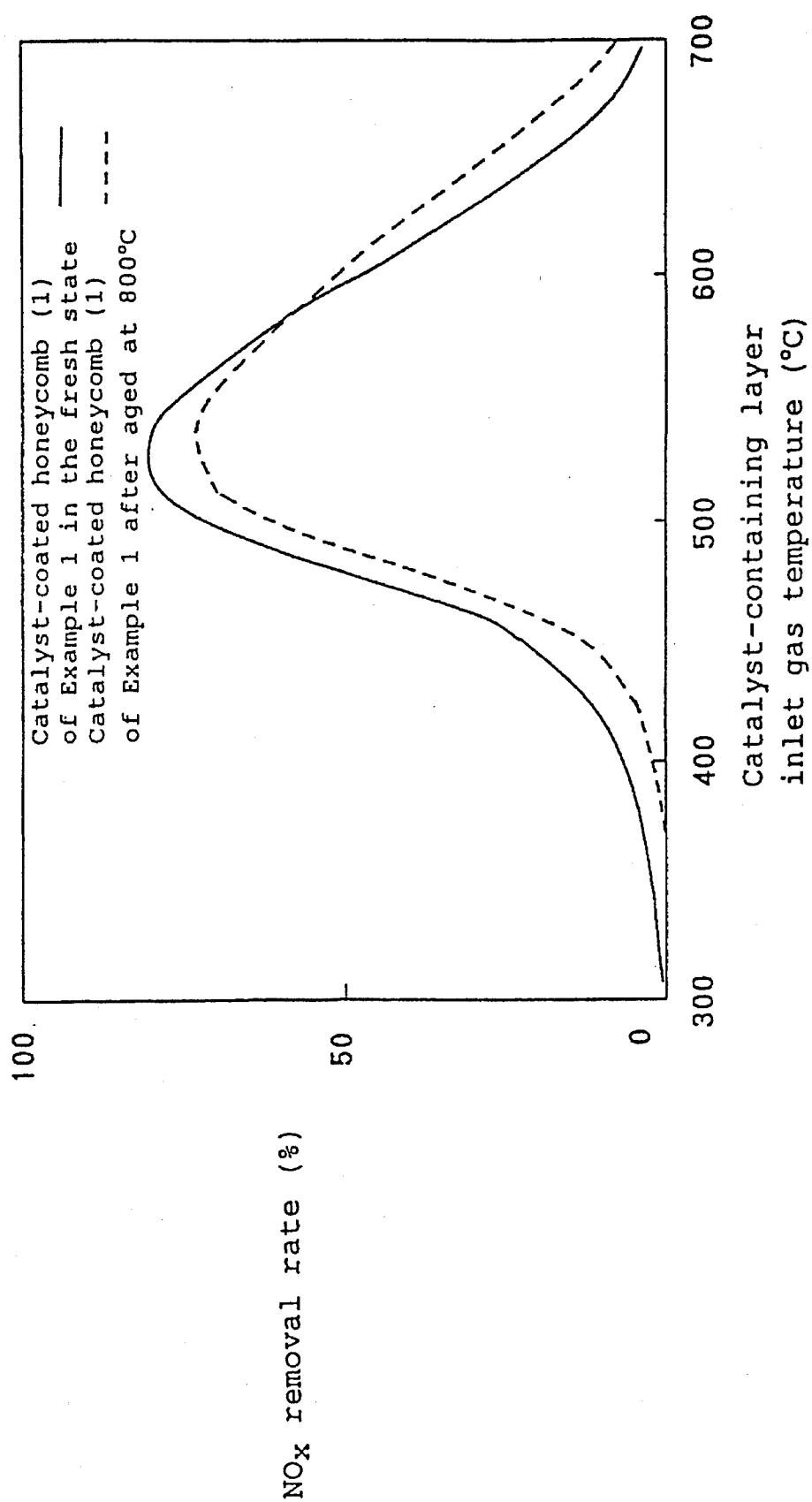

NO$_x$ REMOVAL CATALYST AND METHOD OF PURIFYING EXHAUST GAS BY USING THE SAME

This is a Divisional application of Ser. No. 08/358,373, filed Dec. 19, 1994.

BACKGROUND OF THE INVENTION

1. Field of the Invention

The present invention relates to a catalyst, suitable for purifying exhaust gas, that is used in removing nitrogen oxides in exhaust gases, particularly those from internal combustion engines such as used by automobiles, and a method of removing NO$_x$ by using said catalyst.

2. Description of the Prior Art

In view of the prevention of global warming, in recent years internal combustion engines of a lean burn system that can suppress the emission of carbon dioxide, for example, lean burn gasoline engines and diesel engines, have attracted notice. The exhaust gas from this type of internal combustion engine contains reducing components, such as carbon monoxide (CO), hydrocarbons (HC), and hydrogen (H$_2$), as well as oxidizing components, such as nitrogen oxides (NO$_x$) and oxygen (O$_2$), and is characterized by an excess of oxygen and the presence of steam as a product of the combustion.

Conventionally, there are many reports that, as a catalyst of purifying this type of exhaust gas, a catalyst consisting of, for example, alumina or a transition metal on alumina is effective for the NO$_x$ reduction reaction that uses hydrocarbons as a reducing agent. Examples of Japanese Pre-examination Patent Publication (KOKAI) No. 4-90826 report use of powdered alumina for FCC as a NO$_x$ reduction catalyst. Also Japanese Pre-examination Patent Publication (KOKAI) No. 4-284848 reports examples wherein use is made of, as a NO$_x$ reduction catalyst, alumina or alumina/silica containing 0.1 to 4% by weight of Cu, Fe, Cr, Zr, Ni, or V. Further, for example, Japanese Pre-examination Patent Publication (KOKAI) Nos. 4-267946, 5-68855, and 5-103949 report that where a catalyst carrying Pt on alumina is used, the NO$_x$ reduction reaction proceeds in a low temperature range of about 200° to 300° C. However, where these catalysts having supported noble metals are used, the combustion reaction of hydrocarbons that are a reducing agent is facilitated and therefore the selectivity of the NO$_x$ reduction reaction is poor, which is a defect.

Some of the inventors of the present application found previously that where a catalyst containing silver is used in an atmosphere having excess oxygen with hydrocarbon used as a reducing agent, the NO$_x$ reduction reaction proceeds selectively, which was disclosed in Japanese Pre-examination Patent Publication (KOKAI) No. 4-281844. After this disclosure, similar NO$_x$ reduction techniques that used a catalyst containing silver were disclosed in Japanese Pre-examination Patent Publication (KOKAI) Nos. 4-354536, 5-92124, and 5-92125. Further, Applied Catalysis B: Environmental 2 (1993) 199–205 reports that an alumina catalyst carrying silver gives better NO$_x$ reduction performance in the copresence of steam than an alumina catalyst carrying Co, Cu, V, or Cr.

However, these conventional silver supported on alumina catalysts are still unsatisfactory as a catalyst for the NO$_x$ reduction reaction by hydrocarbons in the presence of steam.

Further, conventionally it is known that the catalyst which uses alumina as a carrier has high dependency on space velocity. That is, it is commonly known in the art and there have been many reports on that catalysts which use alumina as a carrier exhibit satisfactory NO$_x$ reduction performance at a low space velocity of about 1,000 to 10,000/hr, however, the NO$_x$ reduction performance drops greatly at a high space velocity of 10,000/hr or more, particularly in the presence of moisture. Because of this reason, the method of treating exhaust gases that is disclosed in Japanese Pre-examination Patent Publication (KOKAI) No. 5-92124, for example, restricts the contact time of the exhaust gases with the catalyst to 0.03 g.sec/cm$^3$ or more, and preferably to 0.1 g.sec/cm$^3$ or more. Japanese Pre-examination Patent Publication (KOKAI) No. 6-71175 discloses a NO$_x$ removal catalyst carrying silver or a silver oxide on a porous inorganic oxide having a specific surface area of 30 m$^2$/g or more and gives alumina as an example of the inorganic oxide. Although the Japanese Pre-examination Patent Publication (KOKAI) No. 6-71175 describes that the practical NO$_x$ removal performance is such that the contact time with exhaust gases is 0.3 sec.g/cm$^3$ or less, in the Examples the shortest contact time with exhaust gases is practically only 0.05 sec.g/cm$^3$.

In the treatment of exhaust gases of lean-burn engines used in vehicles, such as automobiles, that are typical internal combustion engines which are operated at a fuel lean air/fuel ratio, another practically essential factor involves the required space and the weight of the structure comprising a catalyst layer or a support substrate coated with a catalyst (which structure is referred hereinafter to as a catalyst-containing layer). This is because, taking the displacement of an engine and the work done by it together into consideration, it is not practical to mount a catalyst-containing layer having a volume that is several times or more the displacement of the engine. Therefore, generally, it is preferable that the volume of a catalyst-containing layer is equal to or smaller than the displacement of an engine. This means that a practical catalyst-containing layer is required to exhibit satisfactory NO$_x$ reduction performance even under conditions wherein the contact time between the catalyst and exhaust gas is very short, for example, less than 0.03 g. sec/cm$^3$, and preferably at most 0.02 g. sec/cm$^3$ (since a practical gas space velocity is over 7,000/hr, and preferably 10,000/hr or over.). However, the NO$_x$ removal performance of conventional silver supported on alumina catalysts with regard to exhaust gases containing steam is unsatisfactory at such a short contact time.

SUMMARY OF THE INVENTION

An object of the present invention is to provide a NO$_x$ removal catalyst that can obviate the above defects of the prior art, can remove NO$_x$ in exhaust gas from an internal combustion engine, which is operated at a fuel lean air/fuel ratio, within a satisfactorily short contact time (or at a satisfactorily high gas space velocity) efficiently, and has a satisfactorily high heat resistance, and a highly efficient and reliable NO$_x$ removal method using said catalyst.

The present inventors have studied keenly in various ways catalysts and NO$_x$ removal methods that can cause the NO$_x$ reduction reaction by hydrocarbons to proceed highly efficiently in an atmosphere having excess oxygen in the presence of steam, and as a result have found to attain the above object by using a catalyst carrying silver on an alumina with particular physical properties, leading to the completion of the invention.

That is, the present invention provides a NO$_x$ removal catalyst comprising an activated alumina wherein the specific surface area measured by the nitrogen adsorption method is 120 m₂/g or more, the bulk density measured by the mercury porosimetry is 0.60 g/cm³ or more, and the skeleton density measured by the mercury porosimetry is 1.80 g/cm³ or less and silver supported on said activated alumina.

The present invention also provides a $NO_x$-removal-catalyst-coated structure that comprises a support substrate made of refractory material, having a number of through-holes and the above $NO_x$ removal catalyst that is coated at least on the inner surface of the through-holes of said support substrate, with the coated amount of said $NO_x$ removal catalyst being 20 to 200 g/liter of said support substrate.

Further, the present invention provides a method of removing $NO_x$ from exhaust gas by bringing exhaust gas from an internal combustion engine, which is operated at a fuel lean air/fuel ratio, in contact with a $NO_x$-removal-catalyst-containing layer, wherein the $NO_x$ removal catalyst contained in the $NO_x$-removal-catalyst-containing layer is the $NO_x$ removal catalyst provided by the present invention.

The $NO_x$-removal-catalyst-containing layer used in this $NO_x$ removal method may be made up only of the above catalyst or may be made up of the above $NO_x$-removal-catalyst-coated structure.

Thus, according to the $NO_x$ removal catalyst and the $NO_x$ removal method of the present invention, in the reduction of $NO_x$ with a wide variety of HC in an atmosphere having an excess of oxygen together with steam, the $NO_x$ can be reduced to nitrogen gas at a high conversion rate even if the contact time between the exhaust gas and the catalyst is as short as 0.02 g.sec/cm³ or less. In addition, since this catalyst has satisfactorily high heat resistance, the practicability is high. Accordingly, the present invention is useful in removing $NO_x$ in exhaust gases from internal combustion engines that are operated at a fuel lean air/fuel ratio.

BRIEF DESCRIPTION OF THE DRAWINGS

The following drawings show results obtained in the Examples.

FIG. 3 is a chart showing the relationship between the $NO_x$ removal rate and the catalyst-containing layer inlet gas temperature of the catalyst-coated honeycomb (1) of Example 1 and the catalyst-coated honeycomb (9)* of Comparative Example 3 by Mode 3.

FIG. 4 is a chart showing the relationship between the $NO_x$ removal rate and the catalyst-containing layer inlet gas temperature of the catalyst-coated honeycomb (1) of Example 1 by Modes 11 to 14.

FIG. 5 is a chart showing the relation between the $NO_x$ removal rate and the catalyst-containing layer inlet gas temperature of the catalyst-coated honeycomb (1) of Example 1 by Mode 15 at the initial stage and after aging at 800° C.

DETAILED DESCRIPTION OF PREFERRED EMBODIMENTS

Figure 1:
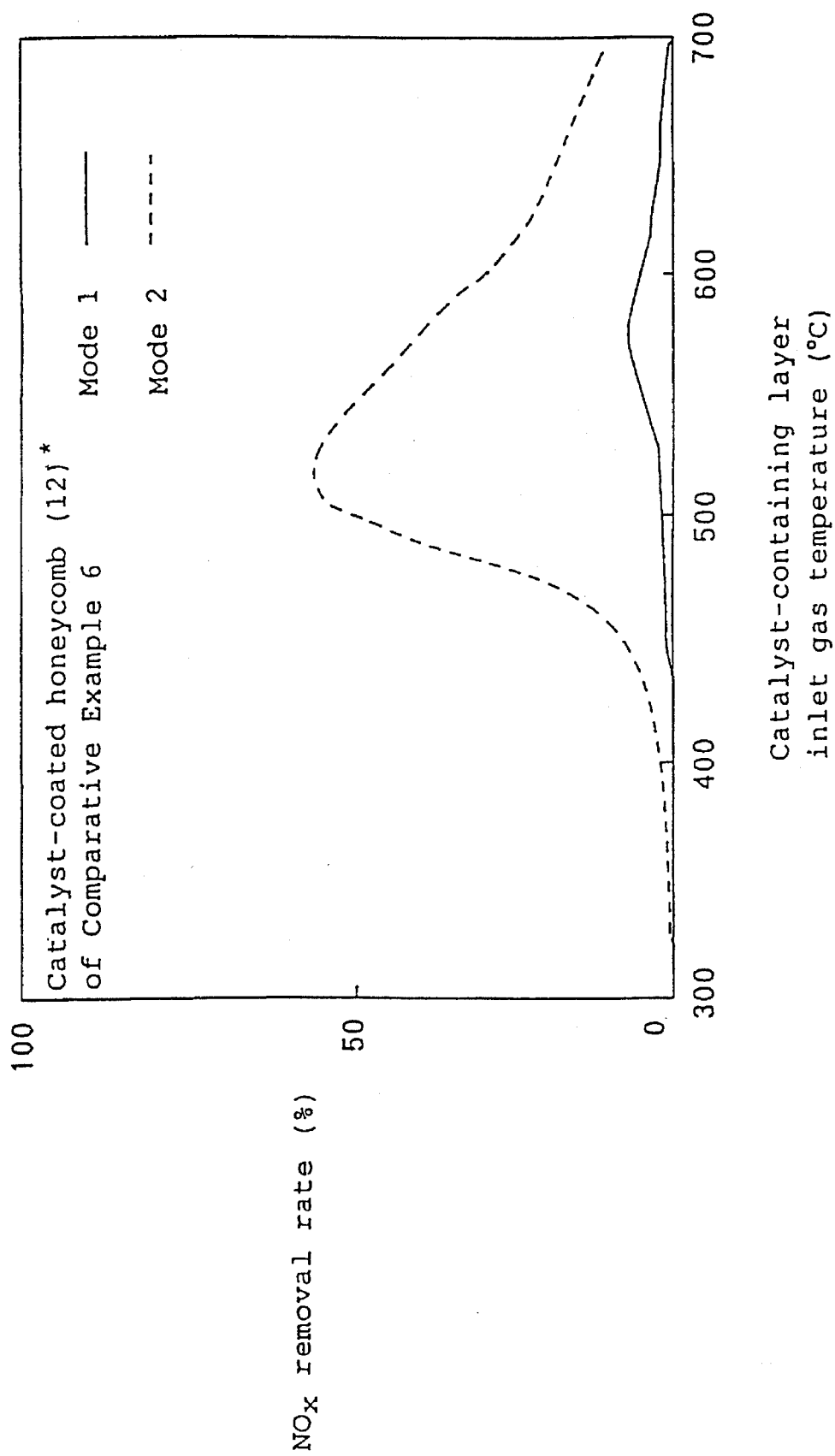
FIG. 1 is a chart showing the relationship between the $NO_x$ removal rate and the catalyst-containing layer inlet gas temperature of the catalyst-coated honeycomb (12)* of Comparative Example 6 by Mode 1 and Mode 2.

In this specification, the contact time between a catalyst and a gas is expressed by the time (in g.sec/cm³) during which 1 g of the catalyst is in contact with 1 cm³ of the gas (assuming standard conditions). The space velocity of an exhaust gas refers to the volume flow rate (cm³/hr/cm³=hr⁻¹) of the exhaust gas passing through a unit volume (1 cm³) of the catalyst-containing layer. In the following description, the temperature of an exhaust gas at the catalyst-containing layer inlet is referred to as "the catalyst-containing layer inlet gas temperature".

Now the present invention will be described in detail below.
The catalyst
Activated aluminas The $NO_x$ removal catalyst of the present invention comprises as a carrier an activated alumina wherein the specific surface area measured by the nitrogen adsorption method is 120 m²/g or more, the bulk density measured by the mercury porosimetry is 0.60 g/cm³ or more, and the skeleton density measured by the mercury porosimetry is 1.80 g/cm³ or less.

Preferably said activated alumina has a specific surface area of 120 m²/g or more, measured by the nitrogen adsorption method. If the specific surface area is less than 120 m²/g, the obtained silver-carrying catalyst is low in conversion activity of HC and unsatisfactory in $NO_x$ conversion activity.

Further, the activated alumina has a bulk density of 0.60 g/cm³ or more, and preferably 0.65 to 0.80 g/cm³, measured by the mercury porosimetry. If the bulk density is less than 0.60 g/cm³, the activated alumina becomes bulky and the obtainable silver-carrying catalyst becomes low in $NO_x$ removal performance where the exhaust gas contains moisture. Particularly, if the bulk density is less than 0.60 g/cm³, the $NO_x$ conversion drops remarkably under conditions wherein the contact time between the catalyst and the gas is as short as 0.02 g.sec/cm³ or less (or the space velocity is high).

Further, the activated alumina has a skeleton density of 1.80 g/cm³ or less, and preferably 1.30 to 1.65 g/cm³, measured by the mercury porosimetry. If the skeleton density is over 1.80 g/cm³, the obtainable silver-carrying alumina catalyst becomes low in $NO_x$ conversion activity in the presence of steam.

An activated alumina is prepared by heating a powder or gel of aluminum hydroxide that is classified as gibbsite, boemite, quasiboemite, bayerite, or nordstrandite from a mineralogical point of view at 300° to 800° C., preferably 400° to 600° C., in air or a vacuum so as to dehydrate the aluminum hydroxide. Generally, during the dehydration step of aluminum hydroxide that is a precursor of an activated alumina, the activated alumina becomes different, for example, in crystallinity, crystal form, grain size and/or micro-, meso-, or macro-pore structure depending on the dehydration method, the dehydration time and/or the dehydration atmosphere. Accordingly, although activated aluminas different in physical properties, such as specific surface area, bulk density, and skeleton density, are produced, it is required to choose an activated alumina that meets the above-mentioned requirements of the present invention. Generally, the type of the activated alumina used in the present invention is classified into a γ-type, an η-type, or a mixed type of these two types from a crystallographic point of view.

By the way, in the process performed by the present inventors for the study of activated aluminas used as a carrier, completely independently of the above finding concerning the specific surface area, the bulk density, and the skeleton density, it has been found that, like the catalyst defined by the present invention, a catalyst carrying silver on an activated alumina whose pore radius and pore volume measured by the nitrogen gas adsorption method satisfy the following conditions where the total pore volume of the pores having a pore radius of 300 A or less is assigned as A, the total pore volume of the pores having a pore radius of 100 A or less is assigned as B, and the total pore volume of the pores having a pore radius of more than 100 A but not more than 300 A is assigned as C, B amounts to 72% or more of A, and C amounts to 20% or less, and more preferably 15% or less, of A, shows excellent $NO_x$ removal and purifying performance for exhaust gas from an internal combustion engine that is operated at a fuel lean air/fuel ratio. Further, it has been found that, among the pores having a pore radius of 100 A or less, preferable pores are such that B' that is defined as the total pore volume of the pore having a pore radius of 50 A or less amounts to 30% or more of A.

The study made thereafter by the present inventors has revealed that the scope of the activated alumina used in the present invention that is defined by the specific surface area, the bulk density, and the skeleton density covers most of the activated aluminas defined by the above pore radius and pore volume.

Silver (active metal)

The catalyst of the present invention carries silver on the above activated alumina. The form of the silver to be carried is not particularly restricted and is normally metal silver, silver oxide or a mixture of these.

The amount of silver to be carried in the catalyst is not particularly restricted and in general preferably is in the range of 0.5 to 10% by weight, and more preferably 1 to 6% by weight, in terms of the metal silver based on the activated alumina.

It is not particularly restricted how to carry the silver. For example, using a water-soluble silver salt, silver is supported on the alumina carrier by the usual impregnation method including the incipient wetness method, the evaporation-to-dryness method, and the like, and then the obtained product is dried and calcined, so that the silver is carried. The drying temperature is not particularly restricted and generally the drying is carried out in such a way that the thus obtained product is dried at about 80° to 120° C. and is calcined at 300° to 800° C., and preferably about 400° to 600° C. If the calcination temperature is over 800° C., it is not preferable because the phase transformation of the alumina occurs.

The catalyst-containing layer

The form of the catalyst-containing layer is not particularly restricted where the catalyst of the present invention is used in the above $NO_x$ removal method.

For example, the catalyst-containing layer used in the $NO_x$ removal method may be made up only of the above catalyst. In this case, for example, a technique wherein the catalyst is filled into a certain space and a technique wherein the catalyst is molded into a prescribed shape are conceivable. The shape of the molded catalyst is not particularly restricted and can include, for example, a sphere, a cylinder, a honeycomb, a helix, or a granule. The shape, the size, and the like can be chosen arbitrarily depending on the use conditions.

Alternatively, the catalyst-containing layer may be made up of a structure formed by coating a support substrate surface with the catalyst. In particular, in the case of purifying exhaust gas from an engine of an automobile, it is not practical to place in the exhaust system a catalyst-containing layer having a large volume relative to the engine displacement. Further, it is required to minimize the pressure loss that is caused by placing the catalyst-containing layer in the flow of exhaust gas and to prevent the abrasion of the catalyst-containing layer due to vibrations or the like during the actual traveling of the automobile for a long period of time. In that case, preferably, the catalyst-containing layer is made up of a $N_x$-removal-catalyst-coated structure that comprises a support substrate of a refractory material having a number of through-holes arranged in the direction of the flow of the exhaust gas and the above $NO_x$ removal catalyst coated at least on the inner surface of said through-holes of the support substrate.

As the refractory material of the support substrate, for example, a ceramic, such as α-alumina, mullite, cordierite, and silicon carbide, and a metal, such as an austenite stainless steel and a ferrite stainless steel, can be used. As the shape of the support substrate, for example, a honeycomb and a foam that are generally used can be used. Preferably the support substrate is a honeycomb support substrate of cordierite or a stainless steel.

The support substrate is formed with a number of through-holes arranged along the direction of the exhaust gas and preferably the support substrate is formed with 30 to 700 through-holes, and preferably 200 to 600 through-holes, per square inch (5.06 cm$^2$) in the cross section perpendicular to the flow of the exhaust gas, with the rate of the hole area being generally 60 to 90%, and preferably 70 to 90%.

Although the catalyst is coated at least on the inner surface of the through-holes, the catalyst may be coated additionally on the end surfaces and the side surfaces of the support substrate. To coat the catalyst on the support substrate, the wash coat method or the sol/gel method is used with or without using a binder.

Preferably the amount of the catalyst to be coated on the support substrate is 20 to 200 g/liter, and more preferably 40 to 160 g/liter and further more preferably 40 to 140 g/liter, of the support substrate. The amount of the silver to be carried per unit volume of the support substrate is not particularly restricted and preferably is in the range of 0.6 to 10 g/liter, and more preferably 1.0 to 6.0 g/liter.

The wash coating of the catalyst powder on the refractory support substrate can be carried out, for example, by mixing the catalyst powder with deionized water plus alumina sol as a binder, kneading them to form a slurry, dipping the support substrate into this slurry, air-blowing the support substrate taken out from the slurry to remove the excess slurry, and then drying and calcining the support substrate.

Alternatively, it is possible that the inner surface of the through-holes of the support substrate is formed previously with a coating of the activated alumina and silver is supported on the activated alumina to form a catalyst coating.

As a preferable embodiment of the present invention, if the catalyst is coated on a substrate having an integral structure, such as a honeycomb, the gas contact time based on the catalyst calculated from a preferable coating amount of 40 to 160 g/liter is less than 0.03 g.sec/cm$^3$, and preferably 0.02 g.sec/cm$^3$ or less.

The $NO_x$ removal method

In this method, exhaust gas from an internal combustion engine that is operated at a fuel lean air/fuel ratio is brought in contact with the above $NO_x$-removal-catalyst-containing layer, thereby $NO_x$ is removed and the exhaust gas is purified. The exhaust gas contains more oxygen than the stoichiometric amount of oxygen required for completely oxidizing reducing components, such as CO, HC, and $H_2$, to $H_2O$ and $CO_2$ and also contain steam that is a combustion product.

In this method, the temperature of the exhaust gas at the catalyst-containing layer inlet is not particularly restricted and may be varied effectively over a wide range of 250° to 600° C. In particular, preferably, the temperature is set in a temperature range in which a high $NO_x$ removal rate, for example, of 40% or more is obtained (which temperature range is hereinafter referred to as the $NO_x$ removal effective temperature range). The $NO_x$ removal effective temperature range may vary depending on the type of HC in the exhaust gas, and for example for $C_2$–$C_6$ paraffins and olefins and for $C_6$–$C_9$ aromatic HC the $NO_x$ removal effective temperature range is from 450° to 600° C., for $C_6$–$C_9$ paraffins and olefins the $NO_x$ removal effective temperature range is from 350° to 550° C., and for $C_{10}$ to $C_{25}$ paraffins and olefins the $NO_x$ removal effective temperature range is from 250° to 500° C.

The internal combustion engine that is operated at a fuel lean air/fuel ratio includes, as mentioned above, for example, a lean burn gasoline engine and a diesel engine. Generally, the exhaust gases from lean-burn engines contain 3 to 8% of $O_2$ and several hundred to several thousand ppm of $NO_x$ as well as several hundred to several thousand ppm of HC, several hundred to several thousand ppm of CO, about several hundred to about several thousand ppm of $H_2$ and several % to about 10% of $H_2O$. Further, the exhaust gases from diesel engines contain about 8 to about 16% of $O_2$, about several hundred to about several thousand ppm of $NO_x$, several ten to several hundred ppm of HC and CO, and several % to about 10% of $H_2O$.

By bringing such exhaust gas in contact with the present catalyst by the above method, $NO_x$ is reduced and decomposed with reducing agents present in small amounts, such as HC, to $N_2$ and $H_2O$. At the same time, the reducing agents, such as HC, are oxidized to $CO_2$ and $H_2O$. If the HC/$NO_x$ ratio of the exhaust gas itself is low, such as the HC/$NO_x$ ratio of exhaust gases from diesel engines, a satisfactory $NO_x$ removal rate can be attained by adopting a system wherein after a fuel HC in an amount of about several hundred to about several thousand ppm in terms of methane concentration (THC) is added to the exhaust gas (preferably the THC/$NO_x$ ratio is from about 1 to about 10), the exhaust gas is brought in contact with the present catalyst.

The HC in the exhaust gases from lean-burn gasoline engines include HC species ranging widely from $C_1$, methane, to $C_2$–$C_9$ paraffins and olefins and $C_6$–$C_9$ aromatic HC. The composition of the HC varies depending on the operation conditions, for example, the rotational frequency of the engine, the load, and the air/fuel ratio (A/F). The HC that contributes mainly to removal of $NO_x$ by the present catalyst includes $C_2$–$C_9$ paraffins and olefins and the $NO_x$ removal effective temperature range is from 350° to 600° C.

In the removal of $NO_x$ in exhaust gas from a diesel engine, if the exhaust gas is treated by adding, to the exhaust gas, a small amount of gas oil as a reducing agent for $NO_x$, the major components of HC in the exhaust gas at the catalyst-containing layer inlet are $C_{12}$–$C_{18}$ paraffins and the $NO_x$ removal effective temperature range is from 250° to 500° C.

According to the present $NO_x$ removal method, the removal of $NO_x$ with HC proceeds effectively in a short contact time (or at a high space velocity) as described above, even in an atmosphere containing excess oxygen in the presence of steam.

EXAMPLES

The present invention will now be described in more detail with reference to the following Examples and Comparative Examples. However, the present invention is not restricted to the following Examples. In the following description, the value of the specific surface area of the alumina was measured by the nitrogen adsorption method and the values of the bulk density and the skeleton density were measured by the mercury porosimetry. The values of the pore radius and the pore volumes of the alumina were measured by the nitrogen gas adsorption method. The number assigned to each of the catalyst-coated honeycombs of Comparative Examples is marked with an asterisk (*) to differentiate them from Examples.

Example 1

Production of a 3-% silver-carrying alumina catalyst-coated honeycomb (1)

(a) 100 g of a γ-alumina powder having a specific surface area of 174 $m^2/g$, a bulk density of 0.76 $g/cm^3$, and a skeleton density of 1.62 $g/cm^3$ (called Alumina A) was dipped in 1,000 ml of a solution containing 4.9 g of silver nitrate (3.1 g in terms of Ag) in deionized water and the obtained mixture was heated to 100° to 110° C. with stirring to evaporate the water. Further, the mixture was calcined at 500° C. for 3 hours in air to obtain a 3-% silver-carrying alumina catalyst.

(b) 30 g of the silver-carrying alumina catalyst prepared in (a) together with 15 g of alumina sol (containing 20% by weight of alumina) and 30 g of deionized water was charged into a ball mill pot thereby water-grinding it to obtain a slurry. Into this slurry, a cylindrical core formed from a commercially available 400-cpsi (cell/inch$^2$) cordierite honeycomb substrate and having a diameter of 2.54 cm and a length of 6.35 cm was dipped, and then after pulling the cylindrical core up, the excess slurry was removed by air-blowing, and the cylindrical core was dried. Thereafter the substrate was calcined at 500° C. for 30 min to obtain a 3-% silver-carrying alumina catalyst-coated honeycomb (1) that had been coated with 100 g of solids (the weight ratio of the catalyst to the binder alumina being 10:1) on dry basis per liter of the honeycomb.

Examples 2 to 6 and Comparative Examples 1 to 7

Production of 3-% silver-carrying alumina catalyst-coated honeycombs (2) to (13)*

In each Example, the procedure was the same as in Example 1, except that, in place of Alumina A, an alumina having the specific surface area, the bulk density, and the skeleton density as shown in Table 1 (Alumina B, C, D, E, F, G, H, I, J, K, L, or M) was used, thereby producing 3-% silver-carrying alumina catalyst-coated honeycombs ((2) to (13)*).

Examples 7 and 8

Production of 3-% silver-carrying alumina catalyst-coated honeycombs (14) and (15)

In each Example, the procedure was the same as in Example 1, except that in (b) in Example 1 the coated amount of solids made up of a 3-% silver-carrying alumina and a binder alumina was 50 g or 150 g on dry basis per 1 liter of the honeycomb (with the weight ratio of the catalyst to the binder alumina being kept constant at 10:1), thereby obtaining 3-% silver-carrying alumina catalyst-coated honeycombs (14) [Example 7] and (15) [Example 8].

Example 9

Production of a 5-% silver-carrying alumina catalyst-coated honeycomb (16)

The procedure was the same as in (a) in Example 1, except that 100 g of Alumina A was dipped in a solution of 8.4 g of silver nitrate (5.3 g of silver in terms of silver) in 1,000 ml of deionized water, thereby obtaining a 5-% silver-carrying alumina catalyst. Then similarly to Example 8, a honeycomb substrate was coated with 150 g of solids containing the 5-% silver-carrying alumina catalyst on dry basis per 1 liter of the honeycomb, thereby obtaining a 5-% silver-carrying alumina catalyst-coated honeycomb (16).

The specific surface areas, the packing densities, and the true densities of the above aluminas used as carriers in Examples 1 to 9 and Comparative Examples 1 to 7 are shown in Table 1. Also the distributions of pores of the aluminas are shown in Table 1 for reference.

Performance Evaluation Example 1
Lean-burn engine exhaust model gas evaluation (Mode 1)

The catalyst-coated honeycomb (1) was loaded in a stainless steel reaction tube having an inner diameter of 30 mm, the reaction tube was mounted to an atmospheric-pressure fixed-bed reaction apparatus, and as a lean-burn engine exhaust model gas a mixed gas made up of 500 ppm of NO (unless otherwise stated, hereinafter the concentration of the gas component is given by volume concentration), 500 ppm of propylene as HC, 5% of $O_2$, 10% of $H_2O$, and the balance of $N_2$ was passed through the reaction apparatus at a flow rate of 20 liter/min by assuming standard conditions.

The gas space velocity per volume of the honeycomb was 37,000/hr and the gas contact time per catalyst coated on the honeycomb was 0.01 g.sec/cm³. The catalyst-containing layer inlet gas temperature was continuously raised from 100° to 700° C. at a heating rate of 30° C./min while the concentrations of the gas components in the gas at the reaction tube outlet were measured continuously.

The total concentration of NO and $NO_2$, the concentration of $N_2O$, and the concentration of HC were measured by a chemiluminescent $NO_x$ analyzer, a non-dispersive infrared $N_2O$ analyzer, and a FID analyzer, respectively. This catalyst performance evaluation condition is assigned as Mode 1. In general, upon the passage of a model gas through the catalyst-coated honeycomb, NO in the gas is converted to $NO_2$, $N_2O$ and/or $N_2$. However, when the exhaust model gas was passed through the present catalyst-coated honeycomb, with the catalyst-containing layer inlet gas temperature being 100° C. or over, little $N_2O$ was produced, the $NO_x$ removal rate (NO conversion rate) is herein defined by the following expression:

$$NO_x \text{ removal rate } (\%) = \frac{A - B}{A} \times 100$$

wherein A represents the NO concentration at the reaction tube inlet and B represents the $NO_x$ concentration at the reaction tube outlet.

With respect to the catalyst-coated honeycombs (2) to (16), similarly the model gas evaluation of Mode 1 was carried out.

With respect to the catalyst-coated honeycombs (1) to (16), the maximum $NO_x$ removal rate Cmax (%) under the performance evaluation mode 1 at the catalyst-containing layer inlet gas temperature between 100° C. and 700° C. and the temperature Tmax (°C.) at that time are shown in Table 1. The catalyst-coated honeycombs (1) to (6) and (14) to (16) of the Examples of the present invention showed that Cmax was 35.5% or more, indicating high $NO_x$ removal performance. In contrast, the catalyst-coated honeycombs (8)* to (13)* of Comparative Example 2 showed that Cmax was less than 20%, indicating quite unsatisfactory $NO_x$ removal rates.

TABLE 1

|  | Catalyst | Alumina | Catalyst-coated honeycomb[1] |
|---|---|---|---|
| Example 1 | 3-% Ag/Al₂O₃ | A (γ-type) | (1) |
| Example 2 | 3-% Ag/Al₂O₃ | B (γ-type) | (2) |
| Example 3 | 3-% Ag/Al₂O₃ | C (γ-type) | (3) |
| Example 4 | 3-% Ag/Al₂O₃ | D (γ-type) | (4) |
| Example 5 | 3-% Ag/Al₂O₃ | E (γ-type) | (5) |
| Example 6 | 3-% Ag/Al₂O₃ | F (γ-type) | (6) |
| Comparative Example 1 | 3-% Ag/Al₂O₃ | G (γ-type) | (7)* |
| Comparative Example 2 | 3-% Ag/Al₂O₃ | H (γ-type) | (8)* |
| Comparative Example 3 | 3-% Ag/Al₂O₃ | I (γ-type) | (9)* |
| Comparative Example 4 | 3-% Ag/Al₂O₃ | J (γ-type) | (10)* |
| Comparative Example 5 | 3-% Ag/Al₂O₃ | K (γ-type) | (11)* |
| Comparative Example 6 | 3-% Ag/Al₂O₃ | L (γ-type) | (12)* |
| Comparative Example 7 | 3-% Ag/Al₂O₃ | M (γ-type) | (13)* |
| Example 7 | 3-% Ag/Al₂O₃ | A (γ-type) | (14) |
| Example 8 | 3-% Ag/Al₂O₃ | A (γ-type) | (15) |
| Example 9 | 3-% Ag/Al₂O₃ | A (γ-type) | (16) |

| | Physical properties of alumina | | | | |
|---|---|---|---|---|---|
| | Specific surface area (m²/g) | Bulk density (g/cm³) | Skeleton density (g/cm³) | Pore radius distribution[2] | |
| | | | | 100 A or less (%) | 100 to 300 A (%) |
| Example 1 | 174 | 0.76 | 1.62 | 95.6 | 4.4 |
| Example 2 | 130 | 0.74 | 1.33 | 80.9 | 19.1 |
| Example 3 | 241 | 0.67 | 1.56 | 97.6 | 2.4 |
| Example 4 | 219 | 0.65 | 1.49 | 96.1 | 3.9 |
| Example 5 | 264 | 0.67 | 1.27 | 93.8 | 6.2 |
| Example 6 | 233 | 0.70 | 1.49 | 97.1 | 2.9 |
| Comparative Example 1 | 107 | 0.78 | 1.59 | 64.6 | 35.4 |
| Comparative Example 2 | 223 | 0.89 | 2.37 | 93.7 | 6.3 |
| Comparative Example 3 | 267 | 0.37 | 0.82 | 79.6 | 20.5 |
| Comparative Example 4 | 149 | 0.55 | 1.95 | 63.1 | 36.9 |
| Comparative Example 5 | 93 | 0.54 | 3.42 | 60.2 | 39.8 |
| Comparative Example 6 | 281 | 0.58 | 2.70 | 54.1 | 45.9 |
| Comparative Example 7 | 266 | 0.60 | 2.55 | 77.4 | 22.7 |
| Example 7 | 174 | 0.76 | 1.62 | 95.6 | 4.4 |
| Example 8 | 174 | 0.76 | 1.62 | 95.6 | 4.4 |
| Example 9 | 174 | 0.76 | 1.62 | 95.6 | 4.4 |

| | Catalyst performance, Mode I $NO_x$ removal rate | |
|---|---|---|
| | Cmax (%) | Tmax (°C.) |
| Example 1 | 50.9 | 561 |
| Example 2 | 42.6 | 579 |
| Example 3 | 65.6 | 542 |
| Example 4 | 63.2 | 545 |
| Example 5 | 35.5 | 535 |
| Example 6 | 56.6 | 554 |

TABLE 1-continued

| | | |
|---|---|---|
| Comparative Example 1 | 5.5 | 569 |
| Comparative Example 2 | 0.5 | 621 |
| Comparative Example 3 | 3.5 | 575 |
| Comparative Example 4 | 7.0 | 612 |
| Comparative Example 5 | 17.1 | 585 |
| Comparative Example 6 | 8.3 | 570 |
| Comparative Example 7 | 20.0 | 595 |
| Example 7 | 54.3 | 552 |
| Example 8 | 77.0 | 519 |
| Example 9 | 73.8 | 525 |

Remarks:
[1] Comparative Examples are marked with an asterisk (*).
[2] Percentage of the pore volumes of pores having a pore radius of 100 A or less and percentage of the pore volumes of pores having a pore radius of more than 100 A and up to and including 300 A in the total pore volume of pores having a pore radius of 300 A or less.

Performance Evaluation Example 2
Moisture-free model gas evaluation (Mode 2)

The $NO_x$ removal rate of the catalyst-coated honeycombs (1) and (12)* at 100° to 700° C. was evaluated in the same way as in Performance Evaluation Example 1, except that, as an exhaust model gas, a dry mixed gas made up of 500 ppm of NO, 500 ppm of propylene, 5% of $O_2$ and the balance of $N_2$ was used.

FIG. 1 shows the dependency of the $NO_x$ removal rate of the catalyst-coated honeycomb (12)* of Comparative Example 6 by Mode 1 and Mode 2 on the catalyst-containing layer inlet gas temperature.

Figure 2:
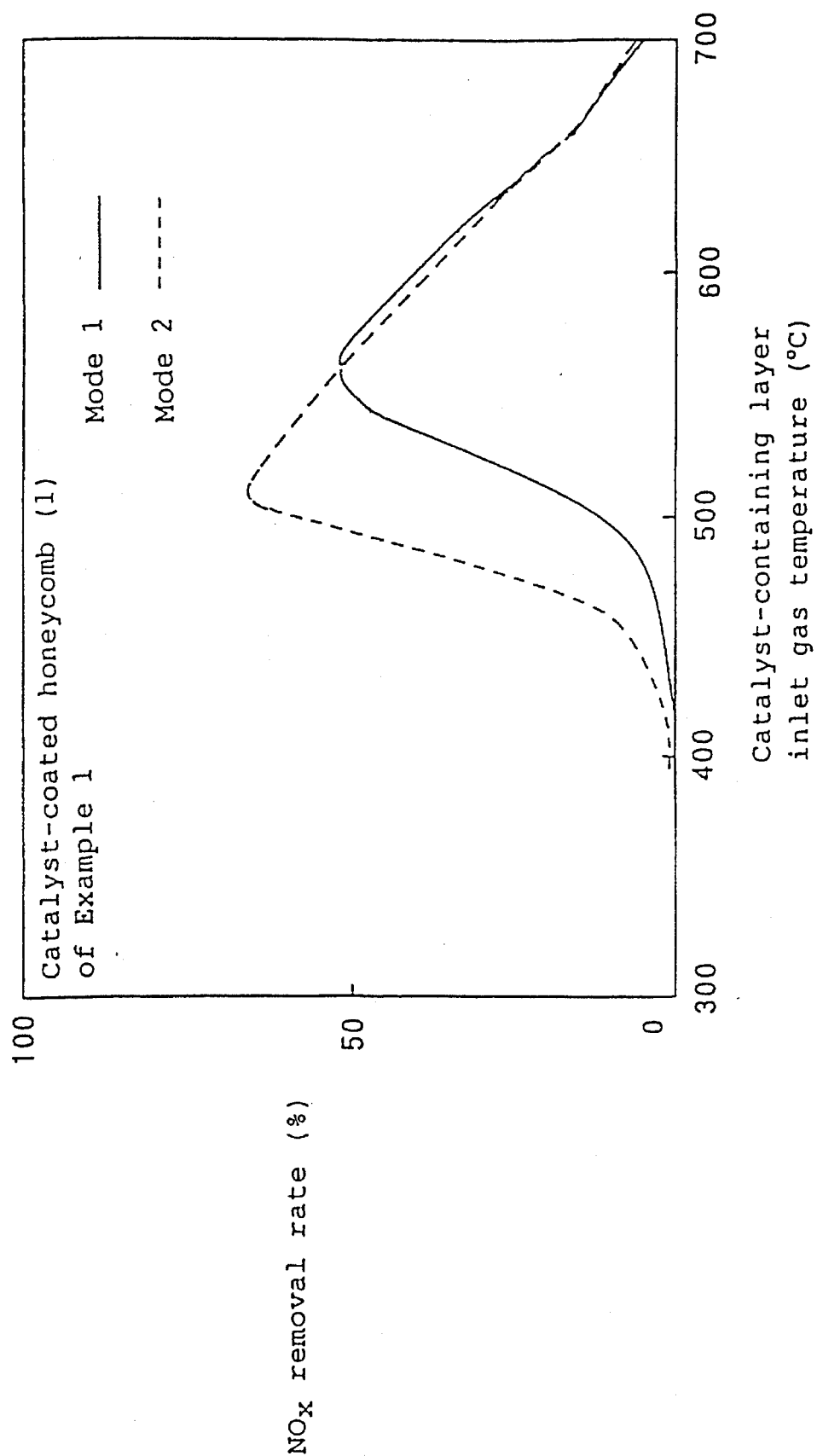
FIG. 2 is a chart showing the relationship between the $NO_x$ removal rate and the catalyst-containing layer inlet gas temperature of the catalyst-coated honeycomb (1) of Example 1 by Mode 1 and Mode 2.

FIG. 2 shows the dependency of the $NO_x$ removal rate of the catalyst-coated honeycomb (1) of Example 1 by Mode 1 and Mode 2 on the catalyst-containing layer inlet gas temperature.

From FIG. 1, it can be understood that by the model gas evaluation by dry Mode 2 containing an excess of oxygen together with HC and NO, the catalyst-coated honeycomb (12)* of Comparative Example shows a satisfactory high $NO_x$ removal rate, Cmax 56.1%, at Tmax 515° C., but in Mode 1, it shows an unsatisfactory $NO_x$ removal rate, Cmax less than 10%, and therefore the hindering effect of the copresent steam on the $NO_x$ removal performance is quite remarkable.

In contrast, the catalyst-coated honeycomb (1) of Example shown in FIG. 2 keeps a satisfactory high $NO_x$ removal rate, Cmax 50.9% (Tmax 561° C.) even in the copresence of 10% of steam of Mode 1 as well as in the dry gas (Cmax 66.1%, Tmax 512° C.) of Mode 2.

Performance Evaluation Example 3
Lean-burn engine exhaust model gas evaluation (Mode 3)

The temperature dependency of the $NO_x$ removal rate of the catalyst-coated honeycombs (1) and (9)* was evaluated in the same way as in Performance Evaluation Example 1, except that the honeycombs of the catalyst (1) of Example 1 and the catalyst (9)* of Comparative Example 3 was cut and the length was shortened from 6.35 cm to 3.81 cm, and the composition of the exhaust model gas to be passed through them was changed to have 500 ppm of NO, 1,000 ppm of propylene, 5% of $O_2$, 10% of $H_2O$, and the balance of $N_2$. The gas space velocity was 62,000/hr based on the honeycomb and the contact time was 0.006 g.sec/cm³ based on the catalyst coated on the honeycomb.

The temperature dependency of the $NO_x$ removal rate of the catalyst-coated honeycombs (1) and (9)* by Mode 3 is shown in FIG. 3. Whereas the catalyst-coated honeycomb (1) of Example 1 of the present invention shows excellent $NO_x$ removal rate even where the contact time is quite short, the performance of the catalyst-coated honeycomb (9)* of Comparative Example is conspicuously low.

Performance Evaluation Example 4
Lean-burn gasoline engine exhaust model gas evaluation (Modes 4 to 10)

The $NO_x$ removal rate of the catalyst-coated honeycomb (1) of Example 1 was evaluated in the same way as in Performance Evaluation Example 1, except that, in place of the propylene as HC species in the exhaust model gas to be passed through the catalyst-coated honeycomb (1) of Example 1, propane (Mode 4), pentane (Mode 5), n-hexane (Mode 6), ethylene (Mode 7), 1-hexene (Mode 8), xylene (Mode 9), or cumene (Mode 10) was added in an amount of 3,000 ppm in terms of $C_1$ concentration.

With respect to the catalyst-coated honeycomb (9)* of Comparative Example 3, similarly the $NO_x$ removal performance was evaluated by using the exhaust model gases of Mode 4 to 10.

With respect to the catalyst-coated honeycombs (1) and (9)*, the maximum $NO_x$ removal rate Cmax (%) by Modes 4 to 10 at the catalyst-containing layer inlet gas temperature between 100° C. and 700° C. and the temperature Tmax (°C.) at that time are shown in Table 2.

Whereas high $NO_x$ removal rates of the catalyst of Example of the present invention are shown when a wide range of paraffins, olefins, and aromatic HC are used, the $NO_x$ removal rate of the Comparative Example is noticeably low.

TABLE 2

| | Catalyst-coated honeycomb (1) of Example 1 | | Catalyst-coated honeycomb (9)* of Comparative Example 3 | |
|---|---|---|---|---|
| | Cmax (%) | Tmax (°C.) | Cmax (%) | Tmax (°C.) |
| Mode 4 | 84.1 | 523 | 6.3 | 614 |
| Mode 5 | 71.3 | 496 | 3.0 | 537 |
| Mode 6 | 65.5 | 492 | 3.9 | 622 |
| Mode 7 | 56.9 | 541 | 12.1 | 568 |
| Mode 8 | 73.2 | 489 | 10.8 | 629 |
| Mode 9 | 90.1 | 588 | 17.7 | 607 |
| Mode 10 | 44.4 | 494 | 3.3 | 614 |

Performance Evaluation Example 5
Diesel engine exhaust model gas evaluation (Modes 11 to 14)

The $NO_x$ removal rate of the catalyst-coated honeycomb (1) of Example 1 was evaluated in the same way as in Performance Evaluation Example 1, except that, in place of the propylene as HC species in the mixed gas to be passed through the catalyst-coated honeycomb (1), n-decane (Mode 11), n-dodecane (Mode 12), 1-decene (Mode 13), and 1-dodecene (Mode 14) were added in an amount of 1,500 ppm in terms of $C_1$ concentration. With respect to the catalyst-coated honeycomb (9)* of Comparative Example 3, similarly the $NO_x$ removal rate was evaluated by passing these exhaust model gases.

FIG. 4 shows the temperature dependency of the $NO_x$ removal rate of the catalyst-coated honeycomb (1) of Example 1 by Modes 11 to 14. With respect to the catalyst-coated honeycomb (9)* of Comparative Example 3, the maximum $NO_x$ removal rate Cmax (%) by Modes 11 to 14 at the catalyst-containing layer inlet gas temperature between 100° C. and 700° C. and the temperature Tmax (°C.) at that time are shown in Table 3.

Whereas the catalyst-coated honeycomb (1) of Example 1 shows a high $NO_x$ removal rate even in the copresence of high-boiling point HC, the catalyst-coated honeycomb (9)* of Comparative Example 3 is noticeably inactive.

TABLE 3

| | Catalyst-coated honeycomb (9)* of Comparative Example 2 | |
|---|---|---|
| | Cmax (%) | Tmax (°C.) |
| Mode 11 | 12.4 | 461 |
| Mode 12 | 15.7 | 453 |
| Mode 13 | 12.1 | 355 |
| Mode 14 | 19.7 | 353 |

Performance Evaluation Example 6

$NO_x$ removal performance evaluation after thermal aging (Mode 15)

The fresh performance of the catalyst-coated honeycomb (1) of Example 1 was evaluated in the same way as in Performance Evaluation Example 1 (Mode 15), except that, as a lean-burn engine exhaust model gas, a mixed gas made up of 500 ppm of NO, 1,500 ppm of propylene, 10% of $O_2$, 10% of $H_2O$, and the balance of $N_2$ was used. Then the thus evaluated catalyst-coated honeycomb was taken out and was loaded into a quartz tubular furnace, and a mixed gas made up of 10% of $H_2O$ and the balance of air was passed to age it thermally at 800° C. for 5 hours. The thus thermally aged catalyst-coated honeycomb (1) was again loaded into a reaction tube and was evaluated by Mode 15. The results are shown in FIG. 5.

As shown in FIG. 5, even after the thermal aging at 800° C. the catalyst-coated honeycomb (1) of Example 1 of the present invention showed high $NO_x$ removal performance (Cmax 73.0%, and Tmax 532° C.) for the lean model gas in the presence of steam under conditions of a short contact time of 0.01 g.sec/cm³ (at a high space velocity of 37,000/hr).

What is claimed is:

1. A method of removing $NO_x$ from exhaust gas containing reducing components and oxidizing components including $NO_x$ from an internal combustion engine which is operated at a fuel lean air/fuel ratio, said oxidizing components being present in an amount more than the stoichiometric amount required for completely oxidizing said reducing components, which method comprises bringing said exhaust gas into contact with a $NO_x$ removal catalyst, wherein the $NO_x$ removal catalyst comprises an activated alumina wherein the specific surface area measured by the nitrogen adsorption method is 120 m²/g or more, the bulk density measured by the mercury porosimetry is 0.60 g/cm³ or more, and the skeleton density measured by the mercury porosimetry is 1.80 g/cm³ or less and silver carried on said activated alumina under conditions effective for the removal of $NO_x$.

2. The method of claim 1, wherein said exhaust gas has a temperature of 250° C. to 600° C. at the beginning of the contact with said $NO_x$ removal catalyst.

3. The method of claim 1, wherein said $NO_x$ removal catalyst is present in the form of a layer which is placed in the flow of the exhaust gas such that the exhaust gas passes through said layer.

4. The method of claim 3, wherein said exhaust gas is brought in contact with said layer for a period of 0.02 g.sec/cm³ or less based on the catalyst.

5. The method of claim 1, wherein said $NO_x$ removal catalyst is present in the form of a coating on a structure which is placed in the flow of the exhaust gas such that the exhaust gas passes through said structure, said structure comprising a support substrate having a number of through-holes and made of a refractory material and the $NO_x$ removal catalyst coated at least on the inner surface of the through-holes of said support substrate, with the coated amount of said $NO_x$ removal catalyst being 20 to 200 g/liter of said support substrate.

6. The method of claim 5, wherein said exhaust gas is brought in contact with said structure for a period of 0.02 g.sec/cm³ or less based on the catalyst.

7. The method of claim 1, wherein said silver carried on said activated alumina is in the form of the metal, an oxide or a mixture thereof.

8. The method of claim 5, wherein the support substrate is made of α-alumina, mullite, cordierite, silicon carbide, an austenite stainless steel, or a ferrite stainless steel.

9. The method of claim 5, wherein said through-holes are 30 to 700 in number per 5.06 cm² in the cross-section perpendicular to the flow of the exhaust gas, with the hole area being 60 to 90% of the total area of said support substrate.

10. The method of claim 5, wherein the carried amount of silver per unit volume of the support substrate is 0.6 to 10 g/liter.

* * * * *